United States Patent
Park

(10) Patent No.: US 7,817,569 B2
(45) Date of Patent: Oct. 19, 2010

(54) METHOD AND APPARATUS FOR DETERMINING ARRIVAL TIME OF DATA PACKETS

(75) Inventor: Sung Wan Park, Suwon-si (KR)

(73) Assignee: LG Electronics, Inc., Seoul (KR)

( * ) Notice: Subject to any disclaimer, the term of this patent is extended or adjusted under 35 U.S.C. 154(b) by 1298 days.

(21) Appl. No.: 11/320,475

(22) Filed: Dec. 29, 2005

(65) Prior Publication Data

US 2006/0165376 A1    Jul. 27, 2006

Related U.S. Application Data

(60) Provisional application No. 60/639,798, filed on Dec. 29, 2004.

(30) Foreign Application Priority Data

Apr. 22, 2005    (KR) .................. 10-2005-0033446

(51) Int. Cl.
    H04L 12/26    (2006.01)
(52) U.S. Cl. .................................. 370/252; 386/83
(58) Field of Classification Search ............... None
    See application file for complete search history.

(56) References Cited

U.S. PATENT DOCUMENTS

| 7,012,893 B2 * | 3/2006 | Bahadiroglu ............... 370/231 |
| 7,027,718 B1 * | 4/2006 | Ohishi et al. .................. 386/98 |
| 7,274,863 B2 * | 9/2007 | Ando ........................ 386/112 |
| 7,397,825 B2 * | 7/2008 | Woodward et al. ......... 370/516 |
| 2004/0233931 A1 * | 11/2004 | Cohen ....................... 370/468 |
| 2005/0041661 A1 * | 2/2005 | Thorsteinson et al. ....... 370/389 |
| 2005/0123284 A1 * | 6/2005 | Kikuchi et al. ............. 386/125 |

* cited by examiner

*Primary Examiner*—Nittaya Juntima
*Assistant Examiner*—Rhonda Murphy
(74) *Attorney, Agent, or Firm*—Harness, Dickey & Pierce, P.L.C.

(57) ABSTRACT

The present invention relates to a method and apparatus of determining arrival time of data packet when a digital broadcast data stream is recorded. According to the present invention, two program clock reference values are extracted from a transport packet sequence, an average packet interval time is obtained based on both the difference between the two program clock reference values and the number of packets between two packets from which the two program clock reference values are extracted, and an arrival time of each packet between the two packets is determined by $t(0)+I*t\_av$, where $t\_av$ is the average packet interval time, $t(0)$ is the program clock reference value of the preceding one among the both packets, and I is an index indicative of the order of packet between the both packets.

11 Claims, 4 Drawing Sheets

: TP containing PCR

PCR c(k) : $PCR(k)\_base*300+PCR(k)\_ext$

FIG. 1

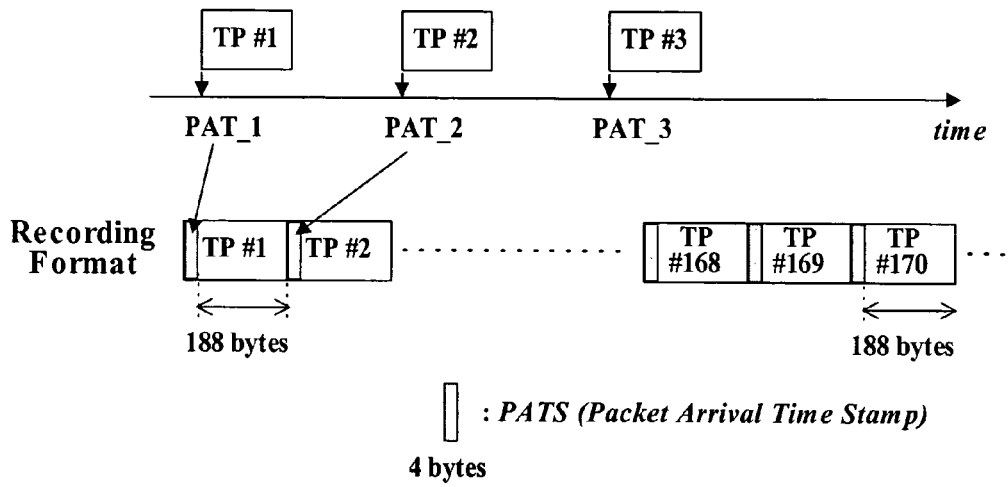

☐ : *PATS (Packet Arrival Time Stamp)*
4 bytes

FIG. 2a

| Syntax | No. of bits |
|---|---|
| transport_packet(){ | |
|     sync_byte | 8 |
|     transport_error_indicator | 1 |
|     payload_unit_start_indicator | 1 |
|     transport_priority | 1 |
|     PID | 13 |
|     transport_scrambling_control | 2 |
|     adaptation_field_control | 2 |
|     continuity_counter | 4 |
|     if(adaptation_field_control=='10' \|\| adaptation_field_control=='11'){ | |
|         adaptation_field() | |
|     } | |
|     if(adaptation_field_control=='01' \|\| adaptation_field_control=='11'){ | |
|         for(i=0;i<N;i++){ | |
|             data_byte | 8 |
|         } | |
|     } | |
| } | |

*This field contains PCR if PID indicates PCR_PID*

METHOD AND APPARATUS FOR DETERMINING ARRIVAL TIME OF DATA PACKETS

PRIORITY INFORMATION

This application claims priority under 35 U.S.C. §119 on Korean Patent Application No. 10-2005-0033446 filed on Apr. 22, 2005, the entire contents of which are hereby incorporated by reference.

This application also claims priority under 35 U.S.C. §119 on U.S. Provisional Application No. 60/639,798, filed on Dec. 29, 2004; the entire contents of which are hereby incorporated by reference.

BACKGROUND

1. Field of the Invention

This document relates to a method and apparatus of determining arrival time of data packet when a digital broadcast data stream is recorded.

2. Description of the Related Art

Optical disks have been popular media to record video contents instead of magnetic tapes. A representative one of them is DVD+/−R that accommodates video contents of about 1 to 6 hours depending on writing modes.

At present, TV broadcast signals have been provided in the digital form and the digital TV broadcast signals provide more higher quality than analog TV signals. Hence a new disk medium whose recording volume is much larger than that of DVD+/−R is required to record the digital TV broadcast signals and development of those kinds of optical disks has been on progress.

An example of those kinds of disks is HD-DVD. FIG. 1 illustrates that a digital broadcast stream is recorded on a HD-DVD. To be specific, MPEG transport packets, each of which has a fixed length of 188-bytes (hereinafter referred to as TP) are recorded in the order that they have been arrived. For each TP, packet arrival time stamp (PATS) indicative of arrival time of the TP is added in the front of the TP, as shown in FIG. 1.

On the other hand, as shown in FIG. 2A, a program clock reference (PCR) is disposed in the TP header for every at least 100 milliseconds. The PCR value is encoded into two fields called $PCR_{base\ of}$ 31 bits and PCR_ext of 9 bits. The PCR_ext has a modulo of 300 and is a value counted by a clock 27 Mhz while the PCR_base is a value counted by carries from the PCR_ext. Because the carry is produced from the PCR_ext every 300 counts, the PCR_base is counted by 90 kHz (=27 MHz/300) clock.

An apparatus of recording the TPs adjusts its system clock based on the PCRs within a TP sequence. Specifically, the system clock is adjusted in such a way that given two consecutive PCRs within a TP stream, the difference between receiving times of the two PCRs, which are represented by counting value by the system clock, becomes equal to the difference between two consecutive PCR values. Therefore, it is preferred that the system clock in the recoding apparatus operates at 27 Mhz which is equal to the frequency at which PCRs are generated.

For some reasons, some recording apparatuses have different system clock frequency from 27 MHz. For example, by using a personal computer equipped with a digital TV broadcast signal receiver, a user wishes to record the digital TV signals on a hard disk. In general, personal computers do not have the clock frequency of 27 MHz.

SUMMARY OF THE INVENTION

In view of the shortcomings of the prior art, it is an object of the present invention to provide a method and apparatus of determining the arrival time of transport packet when recording a digital broadcast stream without the same clock frequency as that of frequency at which program clock reference (PCR) values disposed within the digital broadcast stream are generated.

The present invention is characterized in that two program clock reference values are extracted from a transport packet sequence, an average packet interval time is calculated based on both the difference between the two program clock reference values and the number of packets between two packets from which the two program clock reference values are extracted respectively, and an arrival time of each packet between the two packets is determined by $t(0)+I*t\_av$, where $t\_av$ is the calculated average packet interval time, $t(0)$ is the program clock reference value of the preceding one among the both packets, and I is an index indicative of the order of each packet between the both packets.

In one embodiment of the present invention, the arrival time information is encoded in the two parts whose clock resolutions are different each other, like the representation of the program clock reference.

In another embodiment of the present invention, the arrival time information is encoded in a value counted based on single clock resolution.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 1 illustrates that a transport packet sequence is recorded on a recording medium;

FIG. 2A illustrates a structure of transport packet;

DETAILED DESCRIPTION OF THE PREFFERRED EMBODIMENT

In order that the invention may be fully understood, preferred embodiments thereof will now be described with reference to the accompanying drawings.

Figure 3:
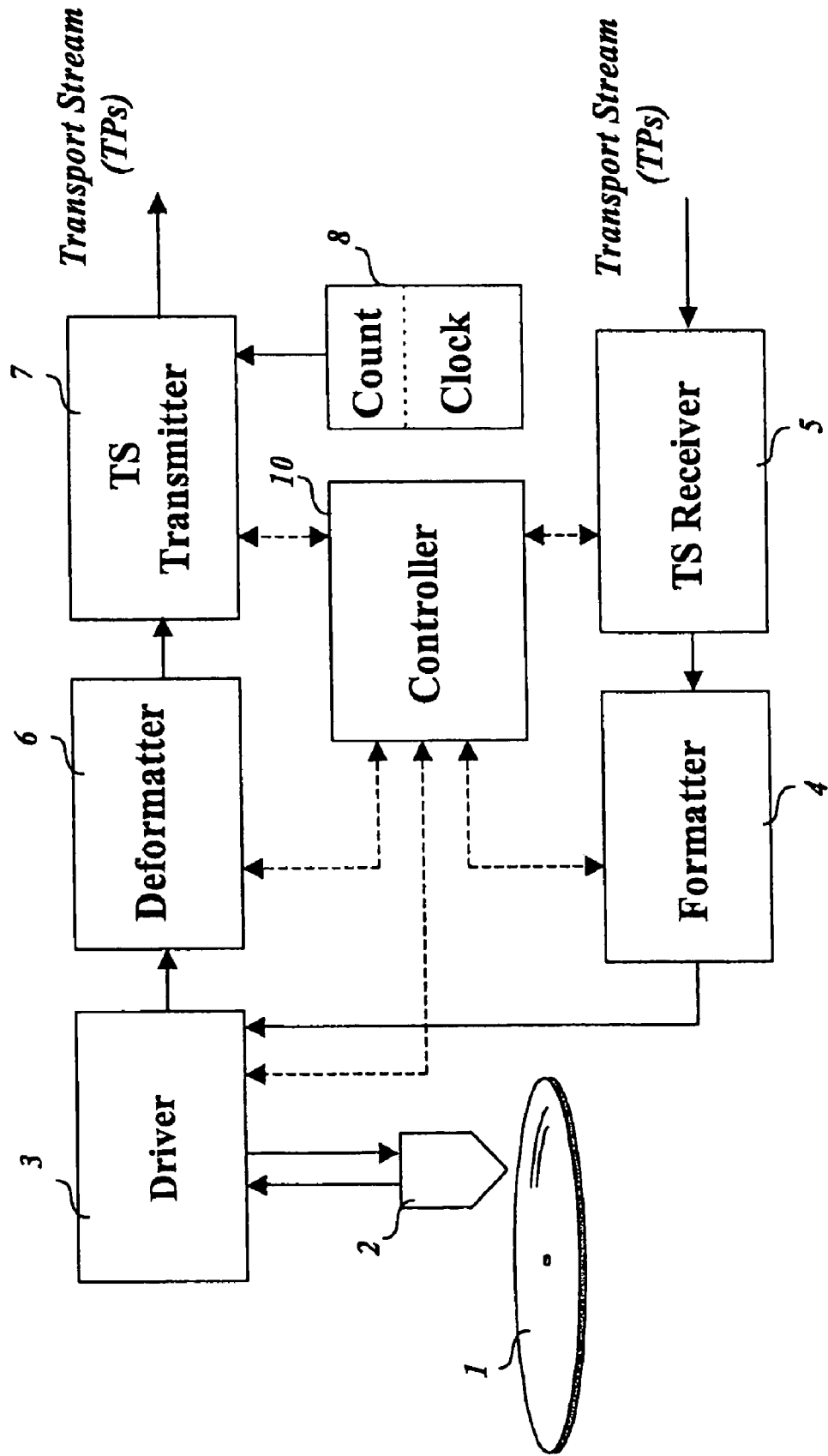
FIG. 3 illustrates a block diagram of an optical disk recording and reproducing apparatus according to one embodiment of the present invention.

FIG. 3 illustrates a block diagram of an optical disk recording and reproducing apparatus according to one embodiment of the present invention. The TS receiver 5 adds to the arrival time to each of TPs within the receiving TP stream, and the formatter 4 makes the output of the TS receiver 5 be accordance with the writing format of the optical disk 1 such as HD-DVD. For example, CRC code insertion and data arrangement are executed at this time. As shown in FIG. 3, the TS receiver 5 and the formatter 4 are controlled by the controller 10. Once the controller 10 receives user's recording command, the controller 10 sends control commands to the TS receiver 5 and the formatter 4 and at the same time controls the driver 3 so that the output of the formatter 4 is recorded onto the disk 1.

The deformatter 6 composes the data stream produced from the driver 3 in units of writing block (packet group), extracts transport packets (tagged with arrival time) in each writing block, and then supplies the transport packets to the TS transmitter 7. The TS transmitter 7 determines the transmission time of each packet based on both its arrival time and counter value of the system clock 8, and then outputs the packets to a display such as digital TV after removing the arrival time.

Determination and insertion of the arrival time of each transport packet during the recording process are described in detail below with reference to FIG. 4.

At first, based on information contained in the packet header, the TS receiver 5 detects the packet whose PID is PCR_ID and adaptation_field_control value is either '10' or '11' and then extract PCR value from the adaptation_field of the detected packet. Once two consecutive PCR values are obtained, the difference between the PCR values is calculated. The transport packets received are stored temporarily in a buffer.

The PCR difference called PCR_dif is obtained by calculating PCRC(k+1)−PCRC(k), were PCRC(i) is calculated by PCR(i)_base*300+PCR(i)_ext and is a value represented by a single clock resolution. Given the PCR difference, among the packets stored in the buffer the number of the packets between the two packets that respectively correspond to PCR (k) and PCR(k+1) is counted (N is obtained by counting from TP(j+0) to TP(j+N−1) in FIG. 4) and an average time difference between consecutive packets is obtained by dividing the PCR difference by the counted number of packets (X=PCR_dif/N in FIG. 4).

Figure 4:
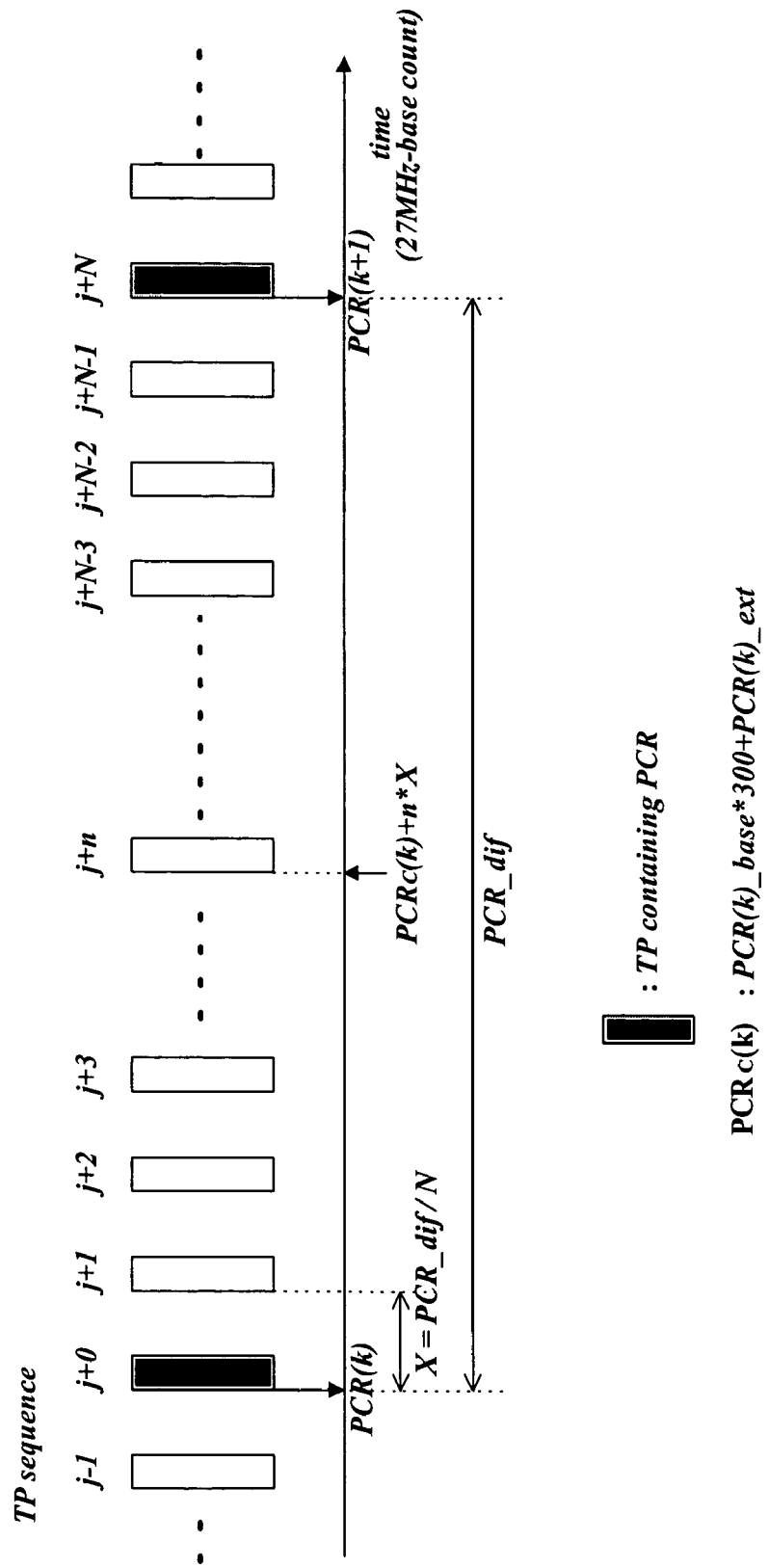
FIG. 4 illustrates the method of determining the arrival time of each transport packet in accordance with one embodiment of the present invention.

By using the average time difference X, the 4-byte-long arrival time is assigned to the packets in the buffer (in FIG. 4, PCRc(k)+X*n is assigned to TP(j+n), n=0, 1, ..., N−1). In this case, the arrival time, that is, counter value clocked by a single clock resolution, i.e., a 27 Mhz clock is represented by a 4-byte-long counter value. In another embodiment, PCRC (k)+X*n is divided by 300, and the quotient and the remainder are encoded into the high 23 bits and low 9 bits in the 4-byte-long arrival time, respectively. In other words, the arrival time is represented by two different clock resolutions (90 kHz in high bits and 27 Mhz in low bits) like PCR representation.

Figure 2B:
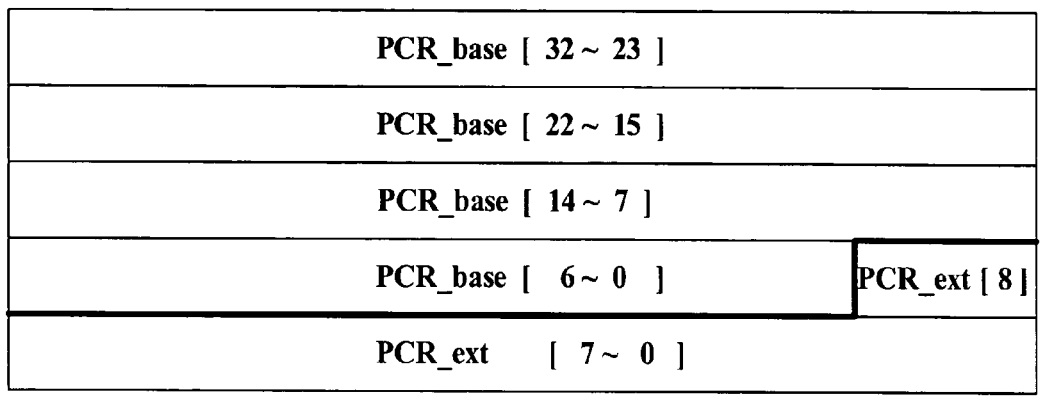
FIG. 2B illustrates a format of program clock reference (PCR)

Since the PCR is data of five bytes as shown in FIG. 2B, the PCRC(k)+X*n is also five bytes in length. Because the purpose of the arrival time information that will be added to each packet is to transmit the packets at the same rate as they are received and hence the time difference is more important than that of absolute time information, after the high 1 byte of PCRC(k)+X*n is removed the remaining 4 bytes are used as information of the arrival time.

Once addition of the arrival time to packets in the buffer is completed, the TS receiver 5 provides the packets in the buffer sequentially for the formatter 4. And then, when a transport packet including PCR(k+2) is received, the above-described operations are applied to a set of N packets from the packet having PCR(k+1) to the packet ahead of packet having PCR(k+2) and then the set of packets tagged with the arrival time is fed to the formatter 4.

The formatter 4 performs some operations such as addition of header information and error correction code information to make the transport packets fed from the TS receiver 5 into write blocks and then supplies them to the driver 3 so that the write blocks are recorded on the disk 1 through the optical pickup 2.

The reproduction and transmission of the digital broadcast stream recorded in accordance with the above-described recording procedure is described below.

Upon user's request of reproduction of the data stream recorded before, the controller 10 controls the driver 3 to read out data from the disk 1. At first, navigational data is read out and loaded in a memory (not shown). Based on the navigational data and user's input through a user interface (e.g., pressing button on the apparatus or remote controller), the controller 10 controls the driver 3 to read out the corresponding write blocks from the optical disk 1. For example, the user can choose a program among the recorded programs (programs are managed and maintained by way of stream objects (SOBs) in the navigational data). And user's input may be generated through selection of menus provided by graphical user interface (GUI) by the controller 10. Using user inputs and the loaded navigation information, the controller 10 identifies a digital data stream corresponding to a chosen program and controls reproduction of the identified data stream.

Receiving data stream from the driver 3, the deformatter 6 organizes the received data stream into write block units, sends the header information of each of the write blocks to the controller 10, and at the same time forwards the transport packets added with their arrival time to the TS transmitter 7. On receiving a transport packet, the TS transmitter 7 determines the transmission time of the packet based the counter value clocked by the clock 8 and the arrival time, which will be described in detail below.

Given a TP(i), the TS transmitter 7 outputs the TP(i) after removing the arrival time PATS(i) and temporarily stores the removed arrival time PATS(i) and a counter value CV(i) clocked by the clock 8 at the time when the TP(i) is transmitted. The expected counter value of the clock 8, denoted by CV(i+1)', at the time when the next packet TP(i+1) will be transmitted is calculated by, $$CV(i+1)' = CV(i) + (PATS(i+1) - PATS(i)) * f0/27 \text{ MHz} \quad \text{Eq. (1)}$$

$$CV(i+1)' = CV(i) + (PATS_C(i+1) - PATS_C(i)) * f0/27 \text{ MHz} \quad \text{Eq. (2)}$$

where f0(≠27 MHz) is the frequency of the clock 8 and $PATS_C(i)$ is given by PATS(i)_base*300+PATS(i)_ext. Eq. (2) is used if PATS is represented by the same representation as that of PCR (encoded two fields: base field by clock resolution of 90 kHz and ext field by clock resolution of 27 MHz) and Eq. (1) is used otherwise.

If CV(i+1)' is not an integer but a real number because f0 is different from 27 MHz, the TS transmitter 7 determines an integer that is closest to the real number CV(i+1)' as CV(i+1). And then, when the counter value clocked by the clock 8 becomes equal to CV(i+1), the TS transmitter 7 sends TP(i+1) after removing PATS(i+1) attached to TP(i+1) and at the same time stores CV(i+1) and PATS(i+1) temporarily to determine the sending time of the next packet TP(i+2).

At least one embodiment of the present invention makes it possible for an apparatus having no system clock of 27 MHz to record a digital broadcast stream on its recording medium and to reproduce the recorded stream at the rate that the packets are received.

The foregoing description of a preferred embodiment of the present invention has been presented for purposes of illustration. Thus, those skilled in the art may utilize the invention and various embodiments with improvements, modifications, substitutions, or additions within the spirit and scope of the invention as defined by the following appended claims.

What is claimed is:

1. A method of receiving and recording a transport packet sequence on a recording medium by a recording device, comprising the steps of:
   extracting two pieces of program timing information, using the recording device, that are disposed within the transport packet sequence intermittently;
   calculating an average packet interval time using the recording device based on both a difference between the two pieces of program timing information and a number of packets between two packets where the pieces of two program timing information are extracted; and
   adding an arrival time to each packet, using the recording device, between the two packets and recording each packet tagged with the arrival time on a recording medium, wherein the arrival time of the each packet is determined by $t(0)+I*t\_av$, where $t\_av$ is the calculated average packet interval time, $t(0)$ is program timing information of a preceding packet among the two packets, and I is an index indicative of order of the each packet between the two packets where the two pieces of program timing information are extracted.

2. The method as set forth in claim 1, wherein the two pieces of program timing information are successively received from the transport packet sequence.

3. The method as set forth in claim 1, wherein the added arrival time has same representation as that of the program timing information.

4. The method as set forth in claim 1, wherein the program timing information is program clock reference (PCR) that is carried in a header of a transport packet.

5. An apparatus of recording a transport packet sequence on a recording medium, comprising:
   a driver configured to drive an optical writing means that writes/reads out signals to/from a recording medium;
   a receiver configured to determine an arrival time of each packet within the transport packet sequence and adding the determined arrival time to each packet; and
   a formatter configured to organize transport packets tagged with their arrival time to adapt to a writing format of the recording medium and sending the organized packets to the driver,
   wherein the receiver extracts two pieces of program timing information that are disposed within the transport packet sequence, calculates an average packet interval time based on both a difference between the two pieces of program timing information and a number of packets between two packets where the two pieces of program timing information are extracted, and adds an arrival time to each packet between the two packets, the arrival time of the each packet being determined by $t(0)+I*t\_av$, where $t\_av$ is the calculated average packet interval time, $t(0)$ is program timing information of a preceding packet among the two packets, and I is an index indicative of order of the each packet between the two packets where the two pieces of program timing information are extracted.

6. The apparatus as set forth in claim 5, wherein the two pieces of program timing information are successively received from the transport packet sequence.

7. The apparatus as set forth in claim 5, wherein the added arrival time has same representation as that of the program timing information.

8. The apparatus as set forth in claim 5, further comprising:
   a deformatter configured to extract transport packets tagged with arrival time from a data stream supplied from the driver;
   clock means for counting a specified clock frequency; and
   a transmitter configured to determine a transmission time of each packet based on both arrival time of the each packet and a counter value clocked by the clock means, and transmit the each packet at the determined transmission time after removing arrival time thereof.

9. The apparatus as set forth in claim 8, wherein a packet is transmitted by the transmitter when difference between a counter value currently clocked by the clock means and the counter value at transmission time of a preceding packet becomes closest to difference between arrival times of the packet and the preceding packet.

10. The apparatus as set forth in claim 8, wherein the specified clock frequency is not 27 MHz.

11. The apparatus as set forth in claim 5, wherein the program timing information is program clock reference (PCR) that is carried in a header of a transport packet.

* * * * *